(Model.)
J. BOWLES.
EYEGLASSES.
No. 386,799. Patented July 31, 1888.
Fig. 1.
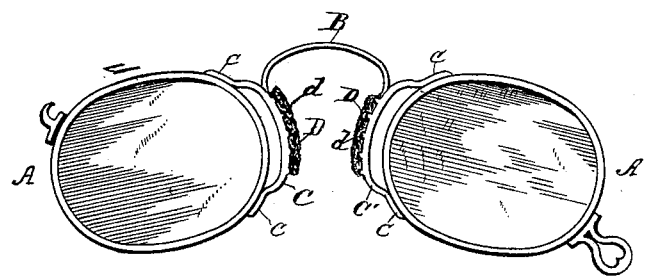
Fig. 2.
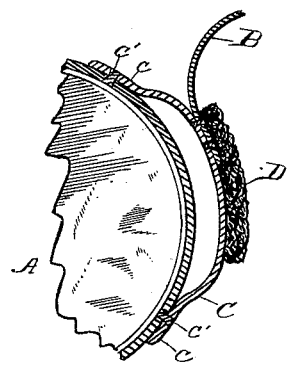
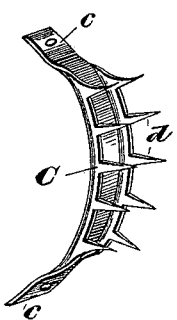
Fig. 3.
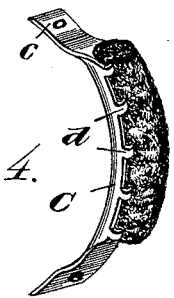
Fig. 4.
Attest:
W. H. H. Knight
H. F. Bernhard
Inventor:
John Bowles
By his Attorneys
Edson Bros.
N. PETERS, Photo-Lithographer, Washington, D. C.

UNITED STATES PATENT OFFICE.

JOHN BOWLES, OF WASHINGTON, DISTRICT OF COLUMBIA, ASSIGNOR OF ONE-FOURTH TO JOSEPH R. EDSON, OF SAME PLACE.

EYEGLASSES.

SPECIFICATION forming part of Letters Patent No. 386,799, dated July 31, 1888.

Application filed May 14, 1887. Serial No. 238,209. (Model.)

*To all whom it may concern:*

Be it known that I, JOHN BOWLES, a citizen of the United States, residing at Washington, District of Columbia, have invented certain new and useful Improvements in Eyeglasses, of which the following is a specification, reference being had therein to the accompanying drawings.

My invention relates to improvements in eyeglasses; and it consists of the novel construction and adaptation of parts, substantially as hereinafter fully described, and particularly pointed out in the claims.

Heretofore the nose-plates of eyeglasses have been provided with corrugated bearing surfaces of hard and soft rubber and other material, which abrade the nose when they are pressed and forced against the same by the spring connecting the lenses or the lens-frames, which is very painful and annoying in some instances, particularly to a beginner.

Another objection to the use of the eyeglasses having bearing-surfaces of the character above referred to is that they are very imperfectly held in place on the nose and are constantly dropping off, especially during the hot or summer season of the year when the perspiration prevents the bearing-surfaces from securing a firm hold.

It is the object of my invention to overcome the above-named objections in devices of this class; and with this end in view I provide the nose-plates of the eyeglasses with improved bearing-surfaces of a soft porous nature, which will absorb the perspiration and seat themselves firmly—that is, with sufficient friction—on the nose to prevent discomfort and annoyance to the wearer.

I affix one or more pieces or strips of sponge to the opposing faces of the nose-plates of a pair of eyeglasses, and these pieces or strips of sponge bear against the opposite sides of the nose. As the sponge is of a soft nature, it will not injure or hurt the nose under the pressure exerted on the lenses or the lens-frames by the spring connecting the same, and the eyeglasses provided with my invention can be worn with great ease and comfort, which are very desirable.

In the accompanying drawings, which illustrate a pair of eyeglasses embodying my present improvements, Figure 1 is an elevation. Fig. 2 is an enlarged vertical sectional view through one of the nose-plates and the lens-frame to which it is connected. Fig. 3 is a detached perspective view of one of the nose-plates before the strip or piece of sponge is connected thereto. Fig. 4 is a detached perspective view of one of the nose-pieces and the strip of sponge secured thereto.

Referring to the drawings, in which like letters of reference denote corresponding parts in all the figures, A designates the lenses or lens-frames, and B the spring connecting the same to normally press them inwardly toward each other, which may be of the ordinary or any preferred pattern, as my invention relates solely to the peculiar form of nose-plate which I will now proceed to describe.

C C' designate the nose-plates, which are affixed or connected at their extremities to the lenses or lens-frames by means of bent tongues $c$, through which are passed the usual screws to secure the tongues to the fixed posts or studs $c'$ on the lens frames, as will be understood by reference to Fig. 2 of the drawings. In practice these nose-plates are preferably made or stamped from a single piece of sheet metal, and they are then bent or curved concentric with the curvature of that part of the lens frame contiguous thereto. Each nose-plate is provided with a series of lips, $d$, which are formed integral with the plates by stamping them from the metal at the time the nose-plates themselves are formed. These lips $d$ are arranged at the side edges of the plates, and they are bent at right angles to the body of the plate, the free ends of the said lips being further bent or curved inwardly toward each other to provide the prongs $d$, which enter the strips or pieces of sponge, D, to securely connect the latter to the nose-plate.

The strip or piece of sponge is first compressed under considerable pressure in a suitable apparatus, and when the pressure thereon is released it remains in its compact form. The strips for both of the nose-plates are placed against the opposing faces thereof to partake of the curved form of the plates, and the strips are securely connected to the nose-plates by the lips or prongs entering the strips. The lips $d$ bear against the side edges of the strips or pieces of sponge to prevent lateral displacement of the strips on the plates, and the prongs of the lips enter the strips a short distance from the outer surface thereof, so that the metallic prongs and lips will be prevented from coming in contact with the nose. I do not, however, desire to confine myself to the particular method of connecting the strips of sponge to the nose-plates, as I am aware that changes therein can be readily made without departing from the spirit of my invention.

By the use of the soft, porous, and absorbent strips or pieces of sponge applied to the opposing faces of the nose-plates on a pair of eyeglasses they can be worn with ease and comfort, and are not liable to drop off and be broken, as the soft sponge will yield or be compressed by the pressure of the spring on the lenses or lens-frames and absorb the perspiration during hot weather.

The edges of the strips of sponge preferably lie flush with the side edges of the nose-plates, so as to present a neat appearance.

The strips of sponge can be readily applied to the nose-plates of eyeglasses of the ordinary well-known class for a trifling sum, and they can be readily replaced by new strips of the same material when worn and unfit for use.

The invention can also be applied to the bridge-pieces and lens-frames of spectacles and other optical instruments.

If desired, the strips or pieces of sponge in their natural condition may be employed in lieu of compressing them, and they can be dyed or given any suitable color.

The generic feature of my invention consists of a pair of eyeglasses provided with a frictional bearing surface consisting of sponge applied to that portion of the same which bears against the nose; and it is obvious that the sponge can be secured in one or more pieces to the nose plates, which may be made separate from and secured to the lenses or the lens-frames, or may be secured to bearing-surfaces made integral with the lens-frames, or to arms or bars which are formed by extending the ends of the connecting-spring and which are suitably secured to the lenses.

To compress the sponge, I take a suitable quantity thereof in a dry state and place it in a screw-press or other device capable of exerting a heavy pressure thereon. After remaining about forty-eight hours under heavy pressure the sponge is cut into strips of suitable size and attached to the nose-plates in the manner hereinbefore described. The prongs of the metallic nose-plates enter the strips of sponge a short distance in rear of the lateral exposed face thereof to prevent metallic parts of the plates from coming in contact with the nose of the wearer and only permit the soft yielding sponge to press upon the nose. When the strips of sponge have become gorged with foreign matter, they can be readily cleansed and fully restored to their original condition without injury thereto by merely rubbing the bearing-surface with a little soap and water.

It will be observed that the manner in which the sponge is held prevents it from swelling when wet, which would give it an unsightly appearance.

Having thus fully described my invention, what I claim as new, and desire to secure by Letters Patent, is—

1. A pair of eyeglasses having the nose-plates thereof provided with strips or pieces of sponge on their opposing faces, substantially as described, for the purpose set forth.

2. As a new article of manufacture, a pair of eyeglasses having the nose-plates thereof provided with a series of lips or prongs and pieces or strips of sponge affixed to the opposing faces of the nose-plates by the lips or prongs thereof, substantially as described, for the purpose set forth.

3. As a new article of manufacture, a pair of eyeglasses having the nose-plates thereof provided with pieces or strips of compressed sponge, substantially as described, for the purpose set forth.

4. As a new article of manufacture, a pair of eyeglasses having the curved nose-plates thereof formed of a single piece of metal and provided with a series of lips or prongs at their side edges, and the pieces or strips of compressed sponge affixed to the opposing faces of the nose-plates, the prongs entering the strips from the side edges thereof, substantially as described, for the purpose set forth.

5. A pair of eyeglasses having frictional bearing-surfaces of sponge secured to that portion of the glasses which bears against the nose, as and for the purpose set forth.

6. As a new article of manufacture, a nose-plate for eyeglasses, provided with a sponge piece, substantially as shown and described.

In testimony whereof I affix my signature in presence of two witnesses.

JOHN BOWLES.

Witnesses:
D. DAVIDSON,
ALLAN E. WILSON.